(12) United States Patent
Ji et al.

(10) Patent No.: US 8,719,192 B2
(45) Date of Patent: May 6, 2014

(54) TRANSFER OF LEARNING FOR QUERY CLASSIFICATION

(75) Inventors: Lei Ji, Beijing (CN); Jun Yan, Beijing (CN); Ning Liu, Beijing (CN); Zheng Chen, Beijing (CN)

(73) Assignee: Microsoft Corporation, Redmond, WA (US)

(*) Notice: Subject to any disclaimer, the term of this patent is extended or adjusted under 35 U.S.C. 154(b) by 326 days.

(21) Appl. No.: 13/081,391

(22) Filed: Apr. 6, 2011

(65) Prior Publication Data
US 2012/0259801 A1    Oct. 11, 2012

(51) Int. Cl.
*G06N 5/02* (2006.01)
*G06F 17/30* (2006.01)

(52) U.S. Cl.
USPC .......................................................... 706/12

(58) Field of Classification Search
CPC ................ G06F 17/30867; G06F 17/30705; G06F 17/30; G06F 17/3061; G06N 5/022; G06N 5/02
See application file for complete search history.

(56) References Cited

U.S. PATENT DOCUMENTS

| | | | |
|---|---|---|---|
| 7,693,865 B2* | 4/2010 | Lu et al. ........................ | 707/771 |
| 8,255,412 B2* | 8/2012 | Gao et al. ....................... | 707/765 |
| 2004/0199546 A1* | 10/2004 | Calistri-Yeh et al. ...... | 707/104.1 |
| 2005/0234953 A1 | 10/2005 | Zhang et al. | |
| 2008/0114607 A1 | 5/2008 | Amer-Yahia et al. | |
| 2008/0256035 A1 | 10/2008 | Zhang et al. | |
| 2009/0198644 A1 | 8/2009 | Buchner et al. | |
| 2009/0222321 A1 | 9/2009 | Liu et al. | |
| 2009/0254512 A1 | 10/2009 | Broder et al. | |
| 2009/0254539 A1 | 10/2009 | Wen et al. | |
| 2009/0319507 A1* | 12/2009 | Chen et al. ........................ | 707/5 |
| 2009/0327205 A1* | 12/2009 | Sweeney ........................ | 706/54 |
| 2009/0327260 A1 | 12/2009 | Li et al. | |

OTHER PUBLICATIONS

Jiang, et al. "Web Search/Browse Log Mining: Challenges, Methods, and Applications", 2010, pp. 1-308.*
Beitzel et al., "Automatic Classification of Web Queries Using Very Large Unlabeled Query Logs", Apr. 2007, Transacations on Information Systems, vol. 25 No. 2, pp. 1-29.*
Chan et al., "Domain Adaptation with Active Learning for Word Sense Disambiguation", Jun. 2007, Association of Computational Linguistics, pp. 49-56.*
Li, et al., "Learning Query Intent from Regularized Click Graphs", Proceedings of the 31st annual international ACM SIGIR conference on Research and development in information retrieval (SIGIR'08), Jul. 2008, 8 pages.
Lu, et al., "Coupling Feature Selection and Machine Learning Methods for Navigational Query Identification", Proceedings of the 15th ACM international conference on Information and knowledge management (CIKM'06), Nov. 2006, pp. 682-689.

* cited by examiner

*Primary Examiner* — Jeffrey A Gaffin
*Assistant Examiner* — Paulinho E Smith
(74) *Attorney, Agent, or Firm* — Carole Boelitz; Micky Minhas; Lee & Hayes (57) ABSTRACT

Transfer of learning trains a new domain for the classification of search queries according to different tasks, as well as the generation of a corresponding domain-specific query classifier that may be used to classify the search queries according to the different tasks in the new domain. The transfer of learning may include preparing a new domain to receive classification knowledge from one or more source domains by populating the new domain with preliminary query patterns extracted for a search engine log. The transfer of learning may further include preparing the classification knowledge in each source domain for transfer to the new domain. The classification knowledge in each source domain may then be transferred to the new domain.

20 Claims, 7 Drawing Sheets

TRANSFER OF LEARNING FOR QUERY CLASSIFICATION

BACKGROUND

Since users may intend to search for different information by using similar keywords, it is crucial for search engines to understand actual user intent behind user search queries. Some search engines may rely on query discovery to classify queries according to semantic topics. Other more sophisticated search engines may classify queries into domains of query tasks that are to be accomplished. For example, when a user inputs the search query for "Xbox 360 purchase", a search engine in the latter category may classify the search query into a "buy" task domain, and the results returned by the search engine may include information related to how to purchase an Xbox 360 game console. Additionally, advertisements delivered by the search engine may relate to electronic retailers that sell game consoles.

However, if the "buy" domain is absent when the search engine in the latter category executes the search query "Xbox 360 purchase", the search engine may instead return results only generally related to the term "Xbox 360", instead of results specifically focused on how to purchase an Xbox 360 game console. The development of domains and a task classifier specific to each of the domains for a search engine may involve considerable efforts in training data selection, feature selection, as well as model training. For example, a team of several developers may take as long as a week to develop of a single query task domain using such efforts. Thus, considering that a search engine may use thousands, if not tens or hundreds of thousands of query task domains to provide the most accurate search results, conventional approaches to query task domain development may become impractical.

SUMMARY

Described herein are techniques for transfer of learning from source query task domains to new query task domain. The transfer of learning may enable the new query task domain to be automatically trained, as well as enable the generation of a corresponding domain-specific query classifier that is used to classify search queries according to different tasks in the new domain.

In at least one embodiment, the transfer of learning may include preparing a new query task domain to receive classification knowledge from one or more source query task domains by populating the new query task domain with preliminary query patterns extracted from a search engine log. The transfer of learning may further include preparing the classification knowledge in each source query task domain for transfer to the new query source domain. The transfer of knowledge may additionally include transfer of the classification knowledge in each source query task domain to the new domain.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

The embodiments described herein pertain to the implementation of transfer of learning from one or more source query task domains to a new query task domain. For the sake of convenience, "query task domains" are also referred to herein as "domains." The transfer of learning may enable a new domain to be trained for the classification of search queries according to different tasks, as well as the generation of a corresponding domain-specific query classifier that is used to classify the search queries according to the different tasks in the new domain. In some embodiments, a parallel algorithm in the Map/Reduce framework may be used to further reduce the computation time for the implementation of transfer of learning for domain generation.

Following the training of a new domain, feature selection techniques may be used to select features from the new domain for classifier training and noise reduction. Finally, a classifier may be trained for the new domain on the basis of the selected features. The classifier and the trained new domain may then be used to extract tasks from new search queries.

Accordingly, the transfer of learning from one or more source domains to a new domain may significantly reduce the time cost and human effort associated with new domain training. Thus, the techniques offer a highly efficient way to quickly scale up the number of trained domains and corresponding domain-specific query classifiers for a search engine. As a result, user satisfaction with the perceived accuracy and usefulness of search query results generated by such a search engine may be increased. Various examples of knowledge transfer from one or more source domains to a new domain in order to train the new domain, as well as develop a domain-specific classifier for the new domain in accordance with the embodiments are described below with reference to FIGS. 1-7.

EXAMPLE SCHEME

Figure 1:
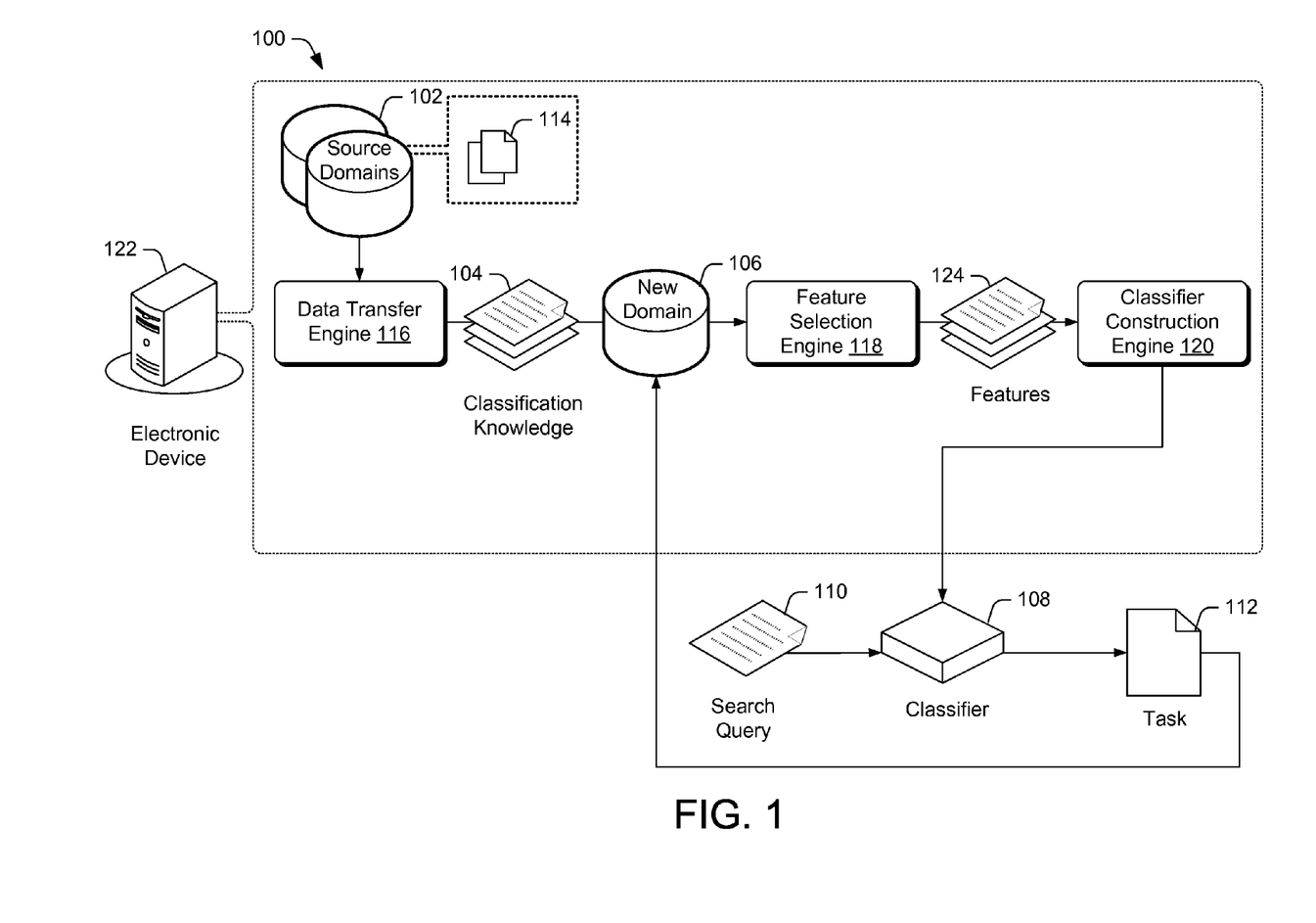
FIG. 1 is a block diagram that illustrates an example scheme that implements learning transfer for domain generation.

FIG. 1 is a block diagram that illustrates an example scheme 100 that implements learning transfer for domain training. The example scheme 100 may output query task classifiers for multiple new domains in a scalable way without the high cost and human effort associated with manual generation of new domains and domain-specific classifiers.

The example scheme 100 may extract classification knowledge 104 that includes query patterns from existing source domains 102. The example scheme 100 may then use the extracted classification knowledge 104 as training data to automatically train a new domain 106 as well as train a corresponding domain-specific classifier 108 for the new domain 106. Subsequently, a search engine may use the new domain 106 and its corresponding domain-specific classifier 108 to classify a search query 110 into the new domain 106 according to a task 112 that is specified in the search query 110. Once the search query 110 is classified into the new domain 106, accurate search results may be generated for the search query 110 based on the classification.

For example, the source domains 102 in the example scheme 100 may include a "computer" domain, a "car model" domain, a "travel" domain, and the like. Each of the source domains 102 may include a corresponding entity dictionary that lists all the entity names that belong in that domain. In such an example, the entity dictionary for the "computer" domain may include the name "Thinkpad 600". Accordingly, a search query for "Thinkpad 600 price" may be transformed with the use of such an entity dictionary into the query pattern "<Entity Name> price", in which <Entity Name> is a symbol.

The classification knowledge 104 in each of the source domains 102 may also include a list of predefined query tasks 114. For example, a list of predefined query tasks 114 for the "computer" domain may include "computer review" task, a "computer compare" task, and a "buy computer" task, and so forth. Thus, in this example, a search engine may use a domain-specific classifier for the "computer" domain to classify the search query "Thinkpad 600 price" into the "computer" domain. Further, the domain-specific classifier may also match the search query "Thinkpad 600 price" query to the "buy computer" task in the "computer" domain.

The example scheme 100 may be implemented by a data transfer engine 116, a feature selection engine 118, and a classifier construction engine 120 that are operating on an electronic device 122. The data transfer engine 116 may select training data in the form of classification knowledge 104 from the one or more source domains 102. The data transfer engine 116 may then transfer the selected classification knowledge 104 to a new domain 106.

In various embodiments, the data transfer engine 116 may use a transfer learning algorithm to transfer classification knowledge 104 in the form of seed query patterns from the source domains 102 to the new domain 106. Accordingly, a seed domain pool of multiple source domains 102 may be visualized as a multi-dimensional space, in which every source domain 102 is a corresponding coordinate plane while the new domain 106 is a plane that can be determined by its mapping to each of the coordinate planes.

Therefore, given the source domains 102 with well-trained task classifiers in the seed domain pool, a query pattern in a new domain 106 may be approximated by knowledge transferred from each of the coordinate planes, i.e., source domains 102. Thus, the transfer of learning may be viewed as a mapping function. For example, given source domains 102 in the form of a "computer" domain and a "cell phone" domain, the data transfer engine 116 may select at least some of the query patterns from each domain as the set of seed query patterns for a new "mp3" domain, as the new "mp3" domain may be extremely similar in nature to the existing "computer" domain and the "cell phone" domain.

As a result, the operations of the data transfer engine 116 are generally dependent on three assumptions. The first assumption is that a new domain 106 is always related to one or more existing source domains 102 so that common classification knowledge 104 may be transfer. Thus, if the new domain 106 is actually not related to any existing source domains 102, then the data transfer engine 116 may create one or more new source domains 102 that are related to the new domain 106. Each of the newly created source domains 102 may be visualized as a new axis in the multi-dimensional space described above.

The second assumption is that identical query patterns in different domains generally present the same use intent across the different domains. For example, the query pattern "free <e-book>" in an "e-book" domain and the query pattern "free <software>" for a "software" domain have the same pattern "free <Entity Name>". The task behind both of the query patterns is also the same, which is the task of "download". However, exceptions to this second assumption do exist. For example, the query pattern "free <person>" for a "politics" domain follows the same "free <Entity Name>" pattern, but the task is obviously not to download something. However, the number of exceptions is generally small so that the second assumption is usually valid.

The third assumption is that the tasks in a source domain 102 generally contain the tasks of a new domain 106. As further described below, this assumption, although simplistic, serves as a valid initial assumption during the transfer of learning.

Thus, by leveraging these three assumptions, the data transfer engine 116 may use a learning transfer algorithm to transfer classification knowledge 104 in the form of query patterns from the source domains 102 to the new domain 106 so that the new domain 106 is populated with seed query patterns. In some embodiments, the data transfer engine 116 may then further use a Random Walk model algorithm to augment the seed query patterns with additional query patterns to generate a large set of training data.

Following the generation of the training data for the new domain 106, the feature selection engine 118 may select features 124 for classifier training and noise reduction. In various embodiments, the features 124 may be selected using natural language processing, such as the use of statistical machine learning algorithms. In at least one embodiment, statistical language processing based on the use of n-gram models may be used to extract features from the training data. However, the feature selection engine 118 may employ other statistical machine language processing techniques in other embodiments.

The classifier construction engine 120 may construct a classifier, such as the domain-specific classifier 108 for the new domain 106, based on the features extracted by the feature selection engine 118. In various embodiments, bigrams and Maximum Entropy (ME) techniques may be used by the classifier construction engine 120 to construct the classifier 108 for the training data.

Once the domain-specific classifier 108 is constructed, a search engine may use the classifier 108 to ascertain the task 112 that is specified in the incoming search query 110 and classify the incoming search query 110 into a domain, such as the new domain 106. For example, if the new domain 106 is a "game console" domain and the search query is "Xbox 360 price", the search engine may use the classifier 108 to match the search query to the "buy game console" task in the "game console" domain during classification.

EXAMPLE ENGINES FOR TRANSFER LEARNING

Figure 2:
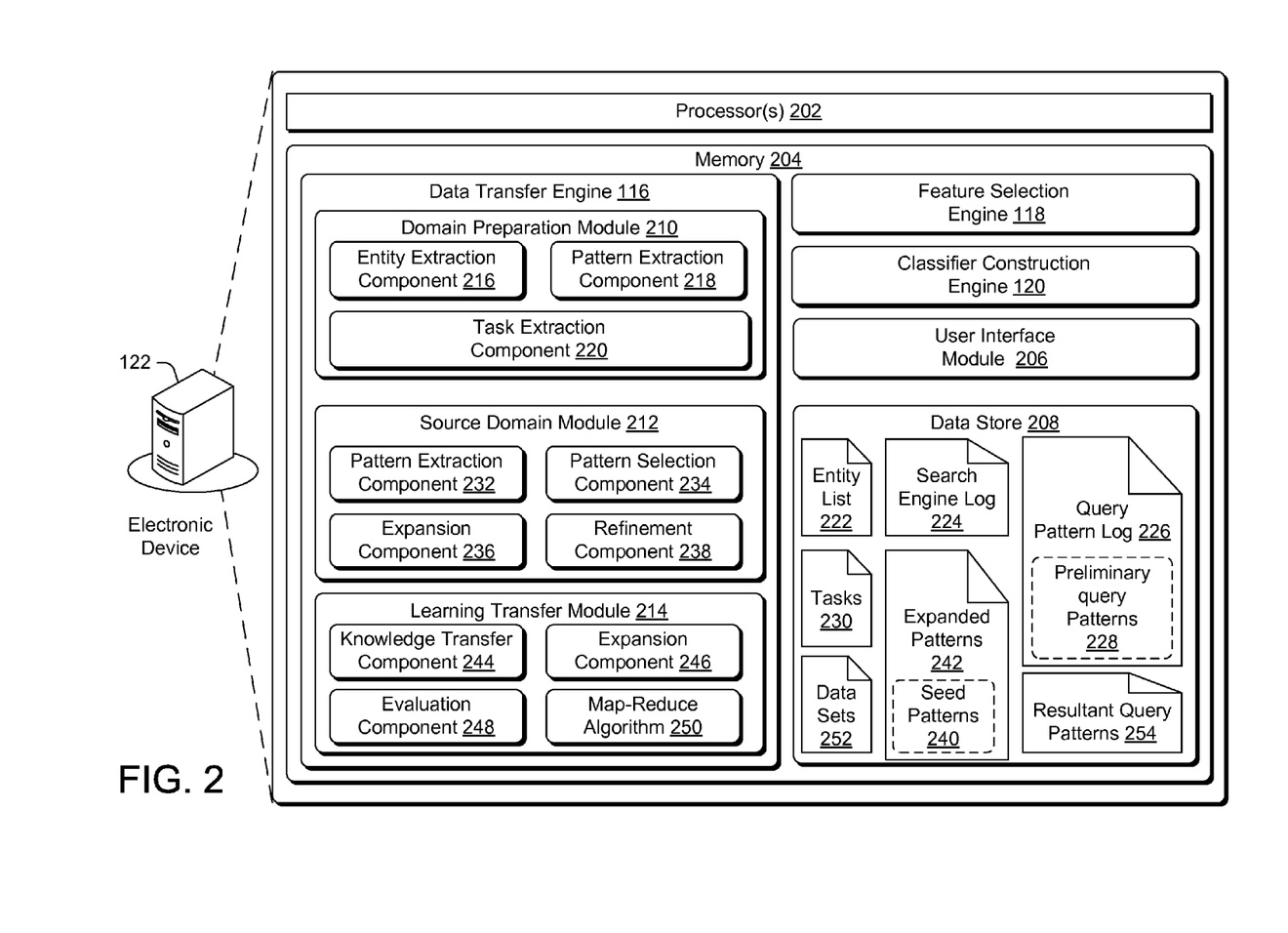
FIG. 2 is a block diagram that illustrates selected components in each of the data transfer engine, the feature selection engine, and the classifier construction engine.

FIG. 2 is a block diagram that illustrates selected components in each of the data transfer engine, the feature selection engine, and the classifier construction engine that are implemented on the electronic device 122.

In various embodiments, the electronic device 122 may be a general purpose computer, such as a desktop computer, a tablet computer, a laptop computer, a server, and so forth. However, in other embodiments, the electronic device 122 may be one of a smart phone, a game console, a personal digital assistant (PDA), and so forth The electronic device 122 may includes one or more processors 202, memory 204, and/or user controls that enable a user to interact with the electronic device. The memory 204 may be implemented using computer readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

The electronic device 122 may have network capabilities. For example, the electronic device 122 may exchange data with other electronic devices (e.g., laptops computers, servers, etc.) via one or more networks, such as the Internet. In some embodiments, the electronic device 122 may be substituted with a plurality of networked servers, such as servers in a cloud computing network.

The one or more processors 202 and memory 204 of the electronic device 122 may implement the data transfer engine 116, the feature selection engine 118, and the classifier construction engine 120, as well as a user interface module 206 and a data store 208. The modules in each engine may include routines, programs instructions, objects, and/or data structures that perform particular tasks or implement particular abstract data types.

The data transfer engine 116 may include a domain preparation module 210, a source domain module 212, and a learning transfer module 214. As described above, the data transfer engine 116 may transfer classification knowledge 104 from one or more source domains 102 to the new domain 106.

The domain preparation module 210 may prepare a new domain, such as the new domain 106, to receive classification knowledge 104 from one or more source domains 102. The preparation may include the pre-population of the new domain 106 with preliminary query patterns and tasks that are extracted from a search engine log, which are then used to by the learning transfer module 214 as baseline knowledge.

The functions of the learning transfer module 214 may depend on the use of such baseline knowledge. As further described below, the learning transfer module 214 may use learning transfer algorithms that compares the baseline knowledge to the classification knowledge 104 in the source domains 102 to perform the knowledge transfer. The domain preparation module 210 may include an entity extraction component 216, a pattern extraction component 218, and a task extraction component 220.

The domain preparation module 210 may use the entity extraction component 216 to generate an entity list 222 for each new domain, such as the new domain 106. In various embodiments, the entity extraction component 216 may employ a Name Entity Recognition (NER) algorithm to extract a list of entities from a plurality of search queries stored in a search engine log 224. The search engine log 224 is a list of search queries that are performed by a search engine in a predefined period of time. Named entity recognition is the location and classification of atomic elements in a text into predefined categories such as persons, objects, organizations, locations, etc.

In some embodiments, the algorithm may use a set of statistical named entity classifiers to identify the named entities in a search query by labeling each word in the search query with a tag corresponding to its position relative to a named entity, i.e., whether it starts, continues, or ends a specific named entity. For example, the classifiers may include a Robust Risk Minimization classifier, a ME classifier, a transformation-based learning classifier, a Hidden Markov Model (HMM) classifier, and/or the like. In other embodiments, NER from search queries may be implemented using a probabilistic approach. Thus, given a search query for "Halo 3 price", the entity extraction component 216 may extract "Halo 3" as the named entity in the search query. The entity extraction component 216 may also have the ability to remove noise and ambiguous extracted entities.

Subsequently, the domain preparation module 210 may use the pattern extraction component 218 to generate a query pattern log 226 for the new domain 106. In various embodiments, the query pattern log 226 may be generated from the records of the search queries in the search engine log 224, which include identified named entities, and the corresponding entity list. For example, given the search query "Thinkpad 600 price" and an entity list that includes the entity "Thinkpad 600", the pattern extraction component 218 may generate the preliminary query pattern "<Entity Name> price" for storage in the query pattern log. In this way, the pattern extraction component 218 may provide the new domain 106 with a query pattern log 226 that includes preliminary query patterns 228 associated with search queries in the search engine log 224.

The domain preparation module 210 may further employ the task extraction component 220 to obtain all the tasks 230 that are encapsulated in the search queries listed in the search engine log 224. In various embodiments, the task extraction component 220 may obtain all the tasks 230 using unsupervised clustering of the search queries in the search engine log 224. The unsupervised clustering may use density-based or similarity-based clustering algorithms to cluster similar search queries according to their content and user click-through logs, which record the correspondences between uniform resource locators (URLs) that users clicked on and search queries that generated the URLs. Once the search queries are clustered, the task extraction component 220 may extract the tasks 230 form the query clusters. In some embodiments, the task extraction component 220 may present the extracted tasks 230 to a user for manual checking and refinement, e.g., elimination of certain tasks 230 that are judged to be unsuitable by the user.

The source domain module 212 may prepare one or more source domains 102, so that the knowledge in such source domains may be transfer to the new domain 106. The source domain module 212 may include a pattern extraction component 232, a pattern selection component 234, an expansion component 236, and a refinement component 238.

Initially, the source domain module 212 may use the pattern extraction component 232 to extract all seed query patterns for a particular source domain 102 (e.g., a "computer" source domain) by using a search engine log (e.g., search engine log 224) and a corresponding entity list (e.g., entity list 222) in the same manner as described with respect to the pattern extraction component 218. The source domain module 212 may then use the pattern selection component 234 to select one or more candidate seed query patterns 240 for output to the user.

In various embodiments, the candidate seed query patterns 240 may be query patterns that have met a predefined frequency threshold. For example, the pattern selection component 234 may output a particular candidate seed query pattern 240 when the candidate seed query pattern 240 was inputted a thousand times in an 8-hour period. The candidate seed query patterns 240 may be manually reviewed by the user based on subjective quality criteria. For example, the user may determine whether the query pattern makes sense in the context of the seed domain. For example, the query pattern "free <person>" may not make sense for a "software" seed domain.

As a result, a candidate seed query pattern 240 that is deemed as nonsensical may be discarded by the user. Each of remaining candidate seed query patterns 240 may be further labeled, that is, tagged with a task classification in the particular source domain 102, by the user. Following labeling by the user, the pattern selection component 234 may provide a corresponding task probability to each labeled seed query pattern, which represents the probability that the labeled query pattern belongs with the task. For example, when the query pattern "<Entity Name> price" is labeled with the "buy computer" task in the "computer" domain, the query pattern is assigned a task probability of 100% for the "buy computer" task.

Subsequently, the source domain module 212 may use the expansion component 236 to supplement the labeled seed query patterns with additional seed query patterns that are generated based on the labeled seed query patterns. The expansion component 236 may generate the additional seed query patterns using probabilities computed by a Random Walk model algorithm.

In various embodiments, the expansion component 236 may generate the additional seed query patterns by propagating a class label of a search query through the bipartite of a click graph from a node at one side to a node on the other aide and back to new unlabeled search queries on the original side. The click graph is a graph that records the correspondences between result URLs that user clicked on and search queries that generated the URLs. The use of the click graph by the expansion component 236 to generate additional seed query patterns is illustrated in FIG. 3.

Figure 3:
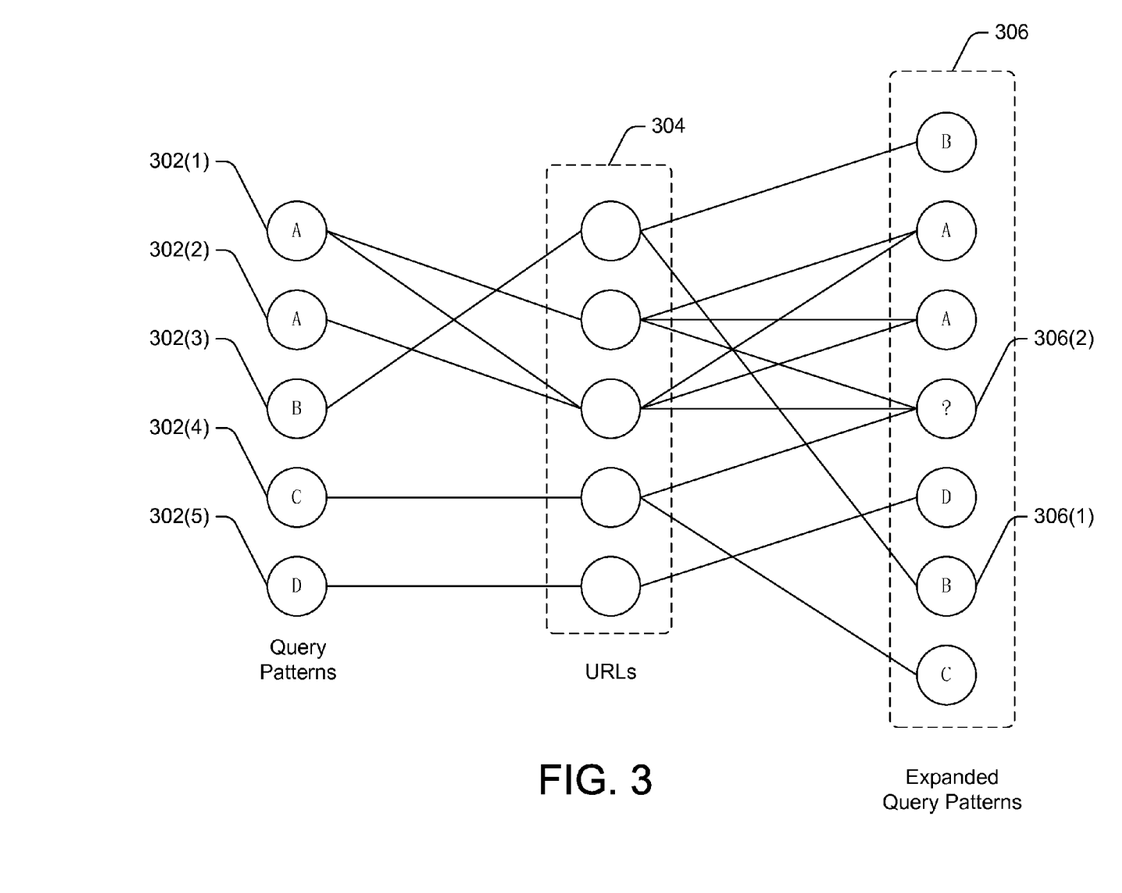
FIG. 3 is a schematic diagram that illustrates the exemplary generation of additional seed query patterns based on labeled seed query patterns.

FIG. 3 is a schematic diagram that illustrates the exemplary generation of additional seed query patterns based on labeled seed query patterns. As shown, there are five example known nodes 302(1)-302(5) that correspond to the labeled seed query patterns. The expansion component 236 may then take the URLs 304 that the user who provided the original five labeled search queries clicked on as bridges to find additional query patterns 306(1)-306(2) that also clicked on these URLs. Thus, each query pattern in the set of expanded seed query patterns 306, which includes the set of additional query patterns 306(1)-306(2), may be labeled with the same task as its corresponding seed query pattern. Further, if there are conflicting labels for one of the expanded seed query patterns 306, such as the query pattern 306(2), the expansion component 236 may assign the particular query pattern associated with the conflicting labels a probability based on the number of URLs associated with each conflicting label that is linked to the particular query pattern.

Returning to FIG. 2, following the supplementation of the labeled seed query patterns with additional seed query patterns, the source domain module 212 may use the refinement component 238 to present the resulting expanded query patterns 242 to the user for review and validation. In at least some embodiments, the user may discard one or more query patterns from the resulting expanded query patterns 242 with associated task probabilities that are below a probability threshold (e.g., less than 50%). In such embodiments, the refinement component 238 may provide functions that assist the user by highlighting and/or automatically discarding query patterns that are below a probability threshold as directed by the user.

In other embodiments, the user may manually review each query pattern of the result expanded query patterns 242 subjectively for reasonableness, and discard query patterns that do not appear to be reasonable. In still other embodiments, the user may use a combination of the probability threshold and subjective review to eliminate one or more query patterns from the resulting expanded query patterns 242.

In this way, the source domain module 212 may produce a final set of training data from a source domain 102 in which each data entry includes the data <pattern, task, probability>, and in which "pattern" is a query pattern that has been verified by the user as valid, the "task" is the task in the particular source domain 102 that the query pattern is labeled with, and "probability" represents the probability that the labeled query pattern belongs to the labeled task. Thus, the final set of training data may constitute the classification knowledge 104 of the particular source domain 102. The source domain module 212 may obtain training data for one or more other source domains 102 in the same manner.

The learning transfer module 214 may transfer the classification knowledge 104 in the form of training data from the one or more source domains 102 to the new domain 106. The learning transfer module 214 may include a knowledge transfer component 244, an expansion component 246, an evaluation component 248, and a map-reduce component 250.

As described above, transfer of learning operates on the assumption that different query patterns in different domains may present the same task. Thus, given this assumption, some patterns extracted from training data of source domains 102 may then be used in a new domain 106.

Accordingly, the operations performed by the knowledge transfer component 244 of the learning transfer module 214 to transfer knowledge from a single source domain 102 to the new domain 106 may be illustrated by assuming that $(X_s, Y_s, P_s)$ denote the data space of training data of the single source domain 102. In the denoted data space, $X_s = \{x_1, x_2, \ldots, x_n\}$ are the set of query patterns (e.g., expanded query patterns 242), while $Y_s = \{y_1, y_2, \ldots, y_m\}$ are the corresponding task labels (class) of $X_s$, and $P_s = \{p_1, p, \ldots p_n\}$ are the corresponding task probabilities. As such, the knowledge transfer component 244 may then use the known query patterns from the single source domain 102 to construct the training data for the new domain 106.

Thus, to illustrate the selection query patterns from the source domain 102, f may be defined for a source domain to denote whether a query pattern belongs to the source domain in which (x, y) is the general element of (X, Y), in which:

$$f_i(x) = \begin{cases} 0, & x \notin X_i \\ 1, & x \in X_i \end{cases}.$$

The knowledge transfer component 244 may also use a novel loss function L in the transfer of learning. Accordingly, assuming that t is the size of training data, to select general patterns and tasks $\{(x'_k, y'_k)\}$ for a new domain 106, the knowledge transfer component 244 may merge those patterns X which minimize the loss function $L(f_t(x), f_s(x))$. The loss function $L(f_t(x), f_s(x))$ is set to keep the consistency between the transferred patterns in the source domain 102 and the new domain 106. Meanwhile, the enlarged size of the set may be represented by the number k, and the total probability on average may be denoted by $$\frac{\sum_{n=1}^{k} P_n}{k}.$$

As a result, the knowledge transfer component 244 may simply use $$\frac{1}{x}$$

to transfer a maximum to a minimum. As such, the relationship between the training set the knowledge transfer component 244 extracts for the new domain 106 and its source in the source domain 102 may be represented by the following equation:

$$TrainSet(t, s) = \{(x'_k, y'_k, p_k)\}_{k=1}^{k=t} \quad (1)$$

$$= \operatorname*{argmin}\left( \sum_{x \in X_s} L(f_t(x), f_s(x)) + |k|^{-1} + \left| \frac{\sum_{n=1}^{k} P_n}{k} \right|^{-1} \right)$$

Thus, by minimizing the objective function in equation (1), the knowledge transfer component 244 may select data sets $\{(x, y, p)\}$ 252, i.e., sets of <pattern, task, probability> as the training data from the single source domain 102 to the new domain 106.

However, it is highly improbable that a single source domain 102 may contain exactly all the tasks in a new domain 106. It is more probable that multiple source domains 102 may contain nearly all the tasks in the new domain 106. As a result, the learning transfer module 214 may also transfer knowledge simultaneously from multiple source domains 102 in a seed domain pool to the new domain 106. During the transfer of knowledge from multiple source domains 102 to the new domain 106, the learning transfer module 214 may select training data from source domains 102 in the seed domain pool that are similar to the new domain 106, rather than from dissimilar source domains 102 of the seed domain pool.

In various embodiments, the similarity between any two domains may be expressed as a corresponding distance between the domains, in which the distance between the two domains increases when the similarity decreases. An equation that calculates the distance between any two probability distributions in a complete space A may be expressed as:

$$\Phi_A(P_1, P_2) = \sup_{a \in A} \frac{|P_1(a) - P_2(a)|}{\sqrt{\frac{P_1(a) + P_2(a)}{2}\left(1 - \frac{P_1(a) + P_2(a)}{2}\right)}} \quad (2)$$

Further, for the purpose of obtain a distance between two domains, the complete space A may be the domains $D_1$ and $D_2$ being compared, in which $(X_1, Y_1)$ and $(X_2, Y_2)$ represent the data space of them, as follows:

$$A_{D_1D_2} = \text{TrainSet}(D_1, D_2) \quad (3)$$

The distance between the two domains may also be dependent on the frequencies of URL click-throughs associated with the query patterns in each domain, as observed from click-through logs. Thus, frequency (Fre) may represent the number of click-throughs of a pattern in the i-th domain:

$$Fre_i(a) = \#\text{Total Click throughs of Pattern } a \quad (4)$$

Moreover, the frequency that a query pattern occurs may directly suggest the importance of the query pattern since the more frequently the query pattern is asked, the more likely that the query pattern may be used again in the future. As such, it is also reasonable to take the frequency that each query pattern occurs into account when measuring the distance between two domains, as follows:

$$P_i(a) = \frac{Fre_i(a)}{\sum_{b \in A} Fre(b)} \quad (5)$$

In equation (5), $P_i(a)$ describes the distribution of frequency of patterns. An issue may arise because the operator Supremum (sup) in equation (2) generally considers the maximum margin between any two probabilities. As a result, if a query in a particular domain is frequently asked because of a popular event that does not exist in any other domain, the distance assessment may be improperly influenced. To deal with this issue, the margins in the sampled frequency patterns may be summed to make the distance calculation more stable and consistent.

Thus, the overall equation that accounts for all the factors during the calculation of distance between any two domains may be expressed as follow:

$$\Phi'_{A_{D_1D_2}}(P_1, P_2) = \quad (6)$$

$$\frac{\sum_{a \in A_{D_1D_2}} |P_1(a) - P_2(a)|}{\sum_{a \in \text{TrainSet}(D_1,D_2)} \sqrt{\frac{P_1(a) + P_2(a)}{2}\left(1 - \frac{P_1(a) + P_2(a)}{2}\right)}} \times \frac{\sum_{b \in D_1 \cup D_2} Fre(b)}{|A_{D_1D_2}|}$$

Accordingly, by implementing the above equation (6), the knowledge transfer component 244 may determine the distance between any two domains. In various embodiments, the output value of the equation (6) that is smaller may indicate that the distance between the two domains is shorter, and the knowledge transfer component 244 is more likely to determine that the two domains are more similar. Conversely, if the output value of the equation (6) is higher, the knowledge transfer component 244 is more likely to determine that the two domains are more dissimilar.

The knowledge transfer component 244 may select source domains 102 in the seed domain pool that are most similar to the new domain 106 so that training data may be transferred from such source domains 102 to the new domain 106. In various embodiments, the knowledge transfer component 244 may select such source domains 102 based on the corresponding values that are outputted with the implementation of equation (6). In such embodiments, the knowledge transfer component 244 may select source domains 102 in the seed domain pool with output values that are less than a predefined value threshold as seed domains for the new domain 106, while discarding source domains 102 whose output values are equal to or greater than the predefined value threshold.

Accordingly, assuming that TrainSet(t, $s_i$) denotes the training set selected from the i-th source domain, which selects set of <pattern, task, probability> that minimize the loss between $f_t$ and $f_{s_i}$, the resulting equation may be as follows:

$$TrainSet(t, s_i) = \{(x'_k, y'_k, p'_k)\}_{k=1}^{k=t} \quad (7)$$

$$= \operatorname{argmin}\left(\sum_{x \in X_{s_i}} L(f_t(x), f_{s_i}(x)) + |k|^{-1} + \left|\frac{\sum_{n=1}^{k} P_n}{k}\right|^{-1}\right)$$

Further, the overall training set selected from multiple similar source domains 102 for the new domain 106 t may be a combination of every transfer result from each source domain 102, as denoted by the equation:

$$Data(t) = \cup_{i=1\ldots n} \Delta_i \times TrainSet(t, s_i) \quad (8)$$

in which $$\Delta_i = \begin{cases} 0, & \Phi'_{A_{D_1 D_2}}(f_t, f_{s_i}) \geq \xi \\ 1, & \Phi'_{A_{D_1 D_2}}(f_t, f_{s_i}) < \xi \end{cases}$$

In equation (8), $\xi$ is a parameter that represents a threshold for deciding which of the source domains 102 may be selected as seed domains to provide training data to the new domain 106. Thus, if a particular $$\phi'_{A_{D_1 D_2}}(f_t, f_{s_i}) < \xi,$$

then the learning transfer module corresponding source domain in seed domain pool may be selected as one of the seed domains. In contrast, if a particular $$\phi'_{A_{D_1 D_2}}(f_t, f_{s_i}) \geq \xi,$$

then the corresponding source domain may be discarded.

Subsequently, after the seed domains are selected for the new domain 106 from the seed domain pool, the knowledge transfer component 244 of the learning transfer module 214 may minimizing the objective function in equation (7) to select data sets (x, y, p)} 252, i.e., sets of <pattern, task, probability> from each of multiple source domains 102 as the training data from the seed domains to the new domain 106.

Once all the training data in the form of data sets 252 of <pattern, task, probability> have been selected for the new domain 106. The learning transfer module 214 may use the expansion component 246 to supplement the query patterns in the selected training data with additional query patterns that are generated based on the query patterns. The expansion component 246 may generate the additional query patterns using probabilities computed by a Random Walk model algorithm in a similar manner as the expansion component 236.

However, in some embodiments, the expansion component 246 may filter the query patterns in the selected training data prior to the generation of the additional query patterns. As described above, each of the query patterns in the selected training data is accompanied by a task probability that represents the probability that the query pattern belongs to a particular task classification. Further, it is advantageous to select query patterns with high task probabilities in the select training data for transfer to the new domain 106 to reduce errors that are transferred to the new domain 106. Thus, the expansion component 246 may discard those query patterns with probabilities that are below a threshold y prior to the generation of the additional query patterns. For example, $TrainSet^p$ (i) may denote query patterns that satisfied the threshold $\gamma$ for task probability p, so that:

$$TrainSet^\gamma(i) = \{(x'_k, y'_k)\}_{k=1}^{k=t} \times Prth(x'_k, y'_k) \quad (9)$$

in which $$Prth(x'_k, y'_k) = \begin{cases} 0, & p < \gamma \\ 1, & p \geq \gamma \end{cases} \quad (10)$$

As shown in equations (9) and equation (10), Prth ($x'_k$, $y'_k$) determines whether a particular query pattern may be retained for the generation of additional query patterns by the expansion component 246. As such, when the probability is greater than or equal to the threshold, the expansion component 246 may retain the particular query pattern, while a probability that is less than the threshold may result in the particular query pattern being discarded by the expansion component 246.

Once the query patterns are selected and further supplemented with additional query patterns, the learning transfer module 214 may use the evaluation component 248 to present the enlarged set of resultant query patterns 254 to the user for review and validation. In at least some embodiments, the user may discard one or more resultant query patterns 254 with associated task probabilities that are below a probability threshold (e.g., less than 50%). In such embodiments, the evaluation component 248 may provide functions that assist the user by highlighting and/or automatically discarding resultant query patterns 254 with task probabilities that are below a probability threshold as directed by the user. In this way, only those query patterns that are associated with high task probabilities in both the source domain 102 and the new domain 106 may ultimately end up as the resultant query patterns 254 for the new domain 106.

In some embodiments, the operations performed by the learning transfer module 214 may be divided up between multiple electronic devices, rather than being performed by a single electronic device 122. This division is possible because each transfer learning from a source domain 102 to the new domain 106 may be performed independently of the transfer of learning from another source domain 102 to the new domain 106. Consequently, it may be possible to distribute the transfer of learning from each source domain 102 to the new domain 106 to a different server, and then subsequently merge the results together to reduce the time spent on the transfer of learning.

In various embodiments, the learning transfer module 214 may use a map-reduce component 250 to distribute the transfer of learning. Map-Reduce is an algorithm for implementing distributed algorithms with two functions: a "map" function and a "reduce" function. In such embodiments, the map function may process the output key/value <new, transferred patterns> pairs. The mappers running on the multiple electronic devices may act as knowledge transfer components operating on different parts of the data and the reduce function may aggregate results from various mappers and emit (new, final patterns). In some embodiments, the Map-reduce algorithm may also provide training data in the form of query patterns to multiple new domains when transferring the classification knowledge 104 from multiple source domains simultaneously.

The feature selection engine 118 may select features 124 for classifier training and noise reduction from the training data, i.e., query patterns that are transferred to the new domain 106. In various embodiments, the features 124 may be selected using natural language processing, such as the use of statistical machine learning algorithms. In at least one embodiment, statistical language processing based on the use of n-gram models may be used to extract features 124 from the training data. However, the feature selection engine 118 may employ other statistical machine language processing techniques in other embodiments.

The classifier construction engine 120 may construct a classifier 108 based on the features 124 extracted by the feature selection engine 118. In various embodiments, bigrams and Maximum Entropy (ME) techniques may be used by the classifier construction engine 120 to construct the classifier 108 for the training data.

The user interface module 206 may enable a user to interact with the task extraction component 220, the pattern selection component 234, the refinement component 238, and the evaluation component 248 using a user interface (not shown) of the electronic device 122. The user interface may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods. In various embodiments, the user interface module 206 may enable a user to evaluate, select, or discard query pattern for the one or more source domains 102 and/or the new domains 106 using the components described above.

The data store 208 may store the one or more source domains 102, the new domain 106, as well as the various query patterns for the domains. The data store 208 may further store the features 124 selected by the feature selection engine 118 and the classifiers that are constructed by the classifier construction engine 120. Additionally, the data store 208 may also store various data that are generated during the transfer of learning from the one or more source domains 102 to the new domain 106. Such data may include search engine logs, click-through logs, click graphs, query pattern logs, data sets, and so forth.

EXAMPLE PROCESSES

FIGS. 4-7 describe various example processes for implementing the knowledge transfer from one or more source domains to a new domain in order to train the new domain and develop a domain-specific classifier. The order in which the operations are described in each example process is not intended to be construed as a limitation, and any number of the described blocks can be combined in any order and/or in parallel to implement each process. Moreover, the blocks in each of the FIGS. 4-7 may be operations that can be implemented in hardware, software, and a combination thereof. In the context of software, the blocks represent computer-executable instructions that, when executed by one or more processors, cause one or more processors to perform the recited operations. Generally, computer-executable instructions include routines, programs, objects, components, data structures, and so forth that cause the particular functions to be performed or particular abstract data types to be implemented.

Figure 4:
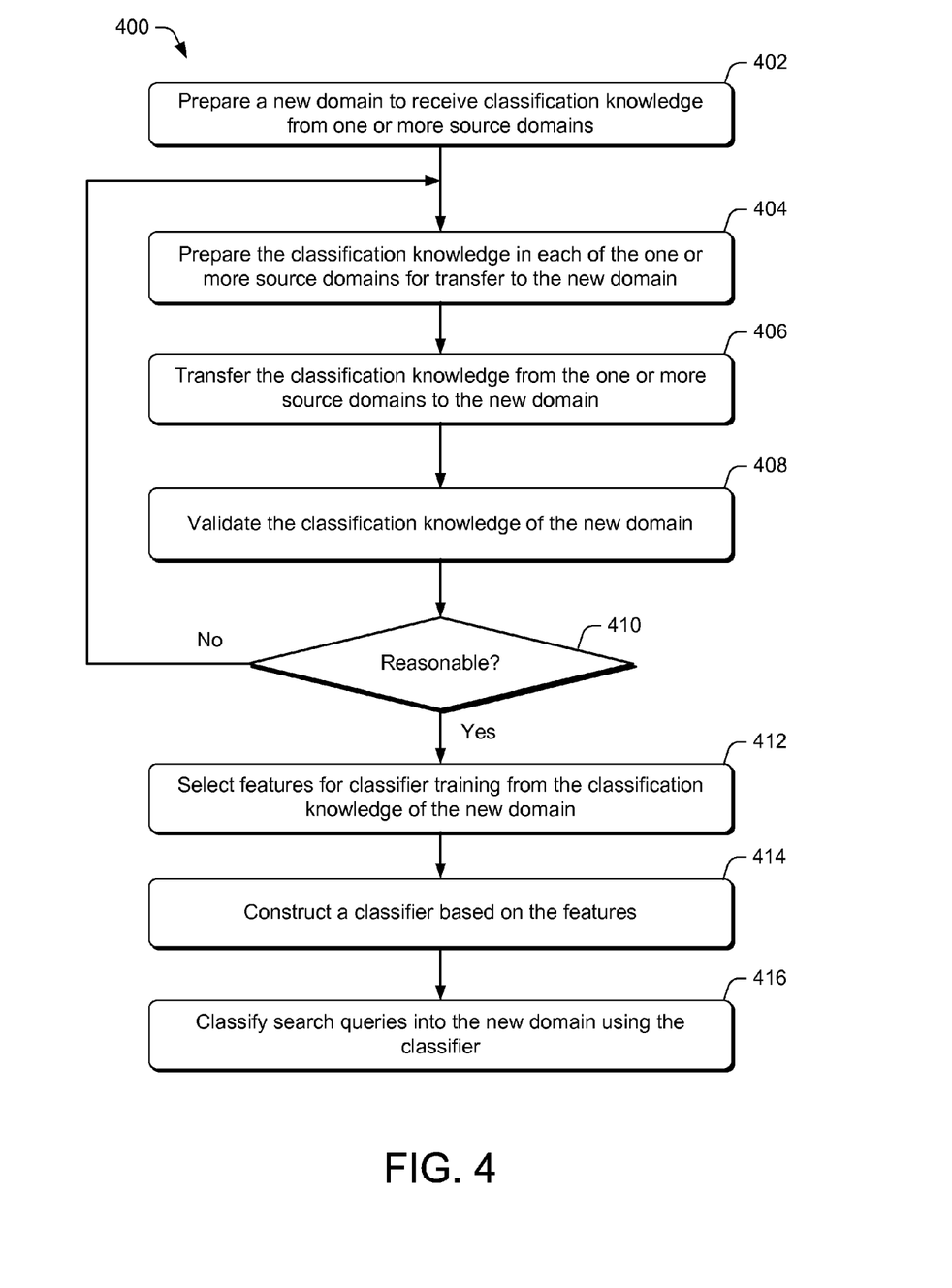
FIG. 4 is a flow diagram that illustrates an example process to train a new domain and a new classifier for classifying search queries according to corresponding tasks.

FIG. 4 is a flow diagram that illustrates an example process 400 that trains a new domain and constructs a new classifier for classifying search queries according to corresponding tasks.

At block 402, the domain preparation module 210 may prepare a new domain 106 to receive classification knowledge 104 from one or more source domains 102. In various embodiments, the preparation may includes the generation of a plurality of preliminary query patterns 228 for the new domain from search queries in a search engine log 224, as well as the extraction of tasks 230 that are encapsulated in the search queries.

At block 404, the source domain module 212 may prepare the classification knowledge 104 in each of the one or more source domains 102 for transfer to the new domain 106. The one or more source domains 102 may be selected by the user to train the new domain 106. The classification knowledge 104 may be in the form of training data, which includes sets of <pattern, task, probability> data. In various embodiments, the preparation may include the selection of one or more existing domains as corresponding source domains, as well the extraction and augmentation of seed query patterns that are in each source domain 102 for transfer to the new domain 106.

At block 406, the learning transfer module 214 may transfer the classification knowledge 104 in the form of training data from the one or more source domains 102 to the new domain 106. As described above, the training data include sets of <pattern, task, probability> data. The learning transfer module 214 may transfer classification knowledge 104 from a single source domain 102 to the new domain 106, or simultaneously transfer classification knowledge 104 from multiple source domains to the new domain 106. For transfer from a single source domain 102, the learning transfer module may the select the classification knowledge 104 from the single source domain 102 and transfer the knowledge to the new domain 106 by minimizing the objective function expressed in equation (1).

The query patterns that are transferred to the new domain 106 may be further supplemented with additional query patterns via the use of a Random Walk model algorithm on a click graph by the learning transfer module 214. The supplementation may create resultant query patterns 254 for the new domain 106. Each of the resultant query patterns 254 that is generated may also include an associated task classification and an associated task probability, which may be encapsulated as a <pattern, task, probability> data set. The simultaneous transfer of classification knowledge 104 from multiple source domains 102 to the new domain 106 is detailed in FIG. 7.

At block 408, the learning transfer module 214 may present classification knowledge of the new domain 106 in the form of the resultant query patterns 254 for validation by a user. The user may evaluate each query pattern in the resultant query patterns 254 based on its associated task probability. Further, the user may discard one or more resultant query patterns 254 with associated task probabilities that are below a probability threshold (e.g., less than 50%).

Accordingly, at decision block 410, the user may determine whether the resultant query patterns 254 in the new domain may act as a reasonable basis for classifier training. In some embodiments, the user may make this determination based on the task probabilities of the query patterns (e.g., mean, mode, etc. of the task probabilities). Accordingly, only resultant query patterns 254 that are associated with high task probabilities in both the source domain 102 and the new domain 106 may ultimately end up as classification knowledge 104 in the new domain 106.

In other embodiments, the user may make this determination based on the number of the resultant query patterns 254 that have been acquired for the new domain (e.g., whether the number of query patterns meets a minimum number threshold). In additional embodiments, the user may make this determination based on subjective evaluation of the reasonableness of the correspondence between each of the resultant query patterns 254 and its associated task, as reflected in the corresponding <pattern, task, probability> data, or a combination of one or more of the above determinations.

Accordingly, if user determines that the resultant query patterns 254 in the new domain 106 constitute a reasonable basis ("yes" at decision block 410), the process 400 may continue to block 412.

At block 412, the feature selection component 118 may select features 124 for classifier training from the classification knowledge 104, i.e., the validated resultant query patterns 254 that are in the new domain 106. In various embodiments, the features 124 may be selected using natural language processing, such as the use of statistical machine learning algorithms. However, the feature selection engine 118 may employ other statistical machine language processing techniques in other embodiments.

At block 414, the classifier construction engine 120 may construct a classifier 108 for the new domain 106 based on the features 124. In various embodiments, bigrams and Maximum Entropy (ME) techniques may be used to construct the classifier.

At block 416, the classifier 108 may be used by a search engine to classify a search query 110 into the new domain 106. For example, if the new domain 106 is a "game console" domain and the search query 110 is "Xbox 360 price", the search engine may use the classifier 108 to match the search query 110 to the "buy game console" task in the "game console" domain.

Returning to decision block 410, if the learning transfer module 214 determines that the resultant query patterns 254 in the new domain 106 do not constitute a reasonable basis ("no" at decision block 410), the process 400 may loop back to block 404. Upon returning to block 404, the user may select one or more additional and/or different domains to act as source domains 102. Once selected, the source domain module 212 may once again prepare the classification knowledge 104 in such domains for transfer to the new domain 106.

Figure 5:
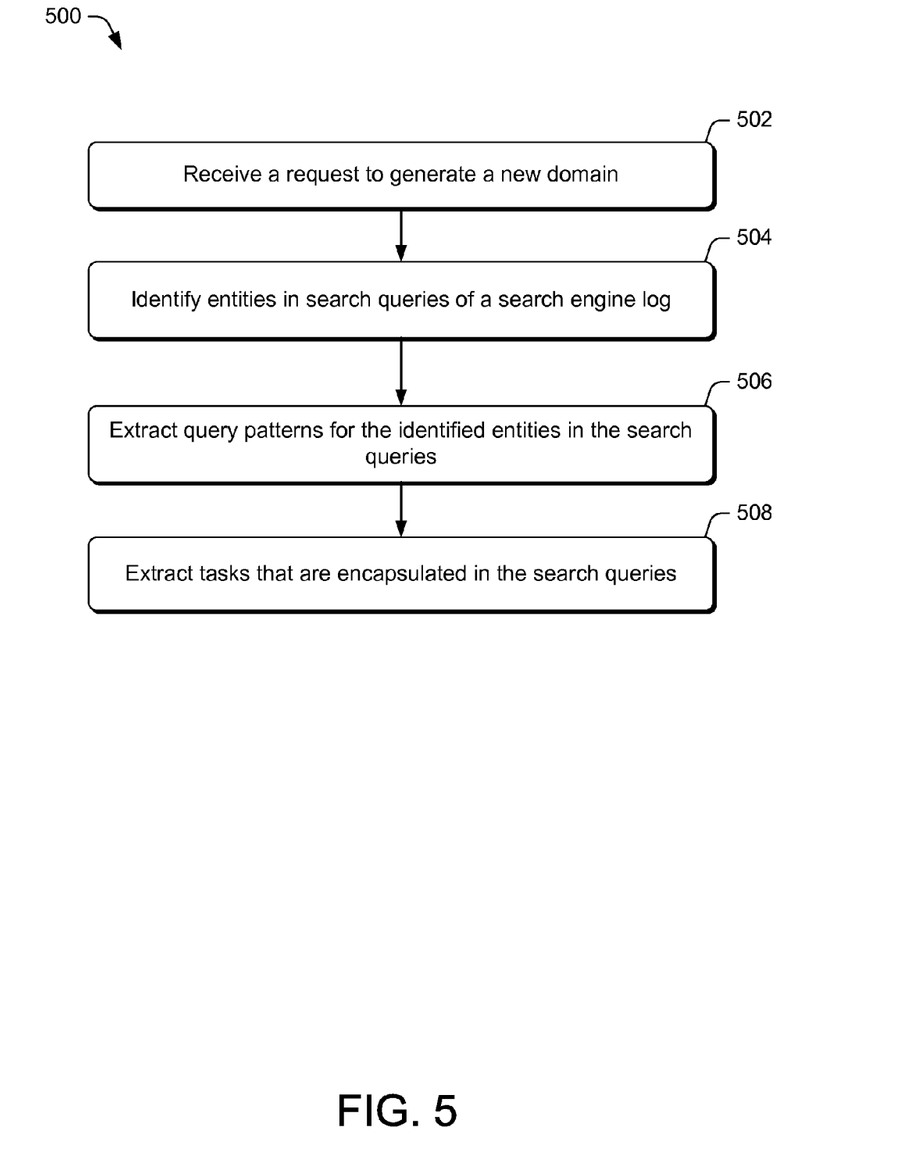
FIG. 5 is a flow diagram that illustrates an example process for preparing a new domain to receive classification knowledge from source query task domains.

FIG. 5 is a flow diagram that illustrates an example process 500 for preparing a new domain to receive classification knowledge from source domains. The example process 500 may further illustrate block 402 of the example process 400.

At block 502, the domain preparation module 210 may receive a request to generate a new domain 106. The request may be initiated by a user. At block 504, the entity extraction component 216 of the domain preparation module 210 may develop an entity list 222. In various embodiments, the entity extraction component 216 may employ a Name Entity Recognition (NER) algorithm to extract a list of entities from a search engine log 224. However, in some embodiments, rather than developing an entity list, a predefined entity list 222 may be used. The entity extraction component 216 may then identify entities that are present in the search queries of a search engine log 224.

At block 506, the pattern extraction component 218 may extract query patterns for the identified entities in the search queries. For example, given the search query "Thinkpad 600 price" and an entity list that includes the entity "Thinkpad 600", the pattern extraction component 218 may generate the query pattern "<Entity Name> price". The extracted preliminary query patterns 228 may be stored in a query pattern log 226.

At block 508, the task extraction component 220 may extract the tasks 230 that are encapsulated in the search queries. In various embodiments, the task extraction component 220 may obtain all the tasks 230 using unsupervised clustering of the search queries in the search engine log 224, and then extract the tasks 230 from the query clusters.

Figure 6:
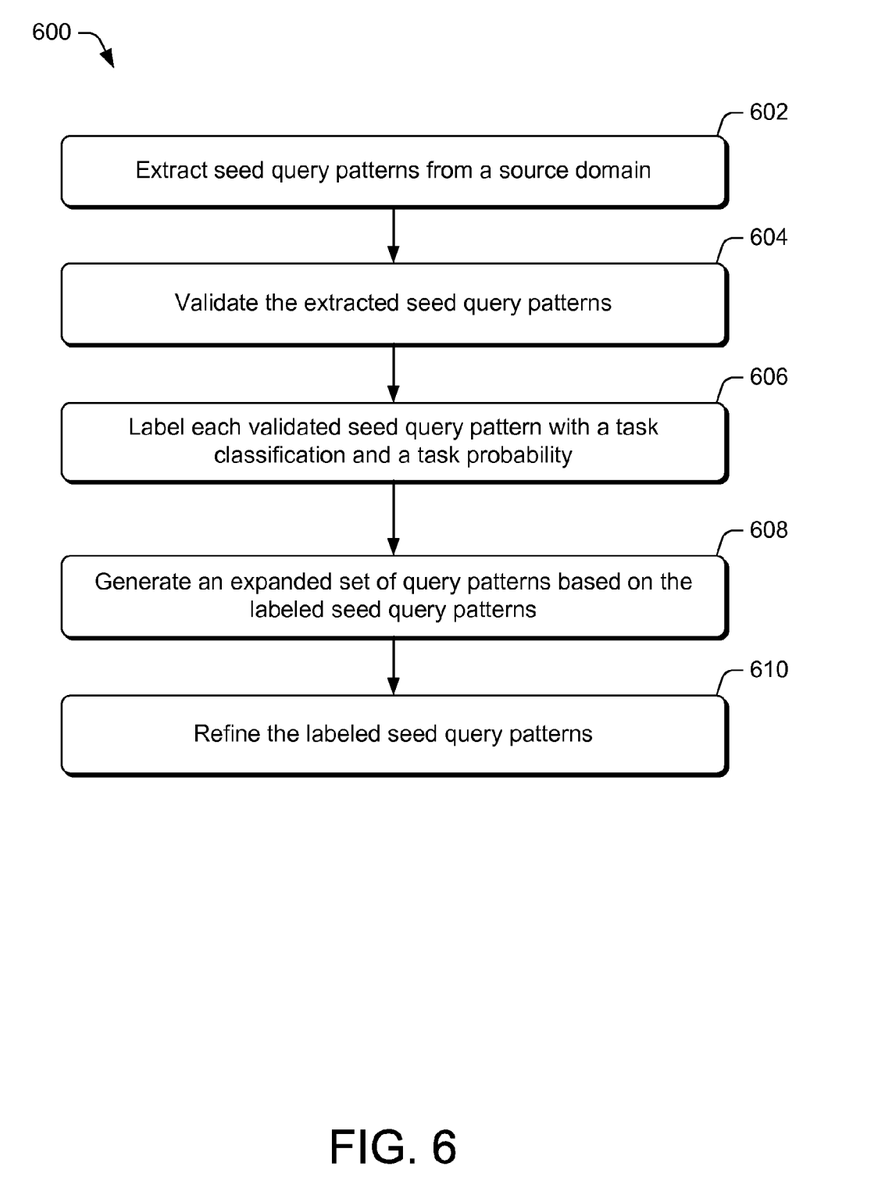
FIG. 6 is a flow diagram that illustrates an example process for preparing the classification knowledge in a source query task domain for transfer to the new domain.

FIG. 6 is a flow diagram that illustrates an example process 600 for preparing the classification knowledge in a source domain for transfer to the new domain. The example process 600 may further illustrate block 404 of the example process 400.

At block 602, the pattern extraction component 232 of the source domain module 212 may extract seed query patterns from a source domain 102. At block 604, the pattern selection component 234 may select one or more candidate seed query patterns 240 that have met a predefined frequency threshold for output to the user. For example, the pattern selection component 234 may output a particular candidate seed query pattern 240 when the candidate seed query pattern was inputted a thousand times in an 8-hour period. The remaining candidate seed query patterns 240 that do not meet the predefined frequency threshold may be discarded. Each of the candidate seed query patterns 240 may be manually validated by the user based on subjective quality criteria, and one or more candidate seed query patterns 240 that do not meet such criteria may be discarded during the validation.

At block 606, each of the candidate seed query patterns 240 may be labeled with a task classification by the user. Further, the pattern selection component 234 may also label each of the validated seed query pattern with a task probability that represents the probability that the labeled query pattern belongs with the task. For example, when the query pattern "<Entity Name> price" is labeled with the "buy computer" task in the "computer" domain, the query pattern is assigned a task probability of 100% for the "buy computer" task. Accordingly, each set of labeled seed query pattern, associated task, and associated task probability may be encapsulated as a <pattern, task, probability> by the pattern selection component 234.

At block 608, the expansion component 236 may generate the expanded query patterns 242 based on the labeled seed query patterns. The expanded query patterns 242 may include additional seed query patterns that are generated with the use of a Random Walk model algorithm on a click graph. Each of the additional seed query pattern that is generated may also include an associated task classification and an associated task probability, which may be encapsulated as a <pattern, task, probability> data set.

At block 610, the refinement component 238 may present the expanded query patterns 242 to the user for review and validation. In various, the user may discard one or more query patterns of the expanded query patterns 242 with associated task probabilities that are below a probability threshold (e.g., less than 50%) from the expanded set of query patterns.

Figure 7:
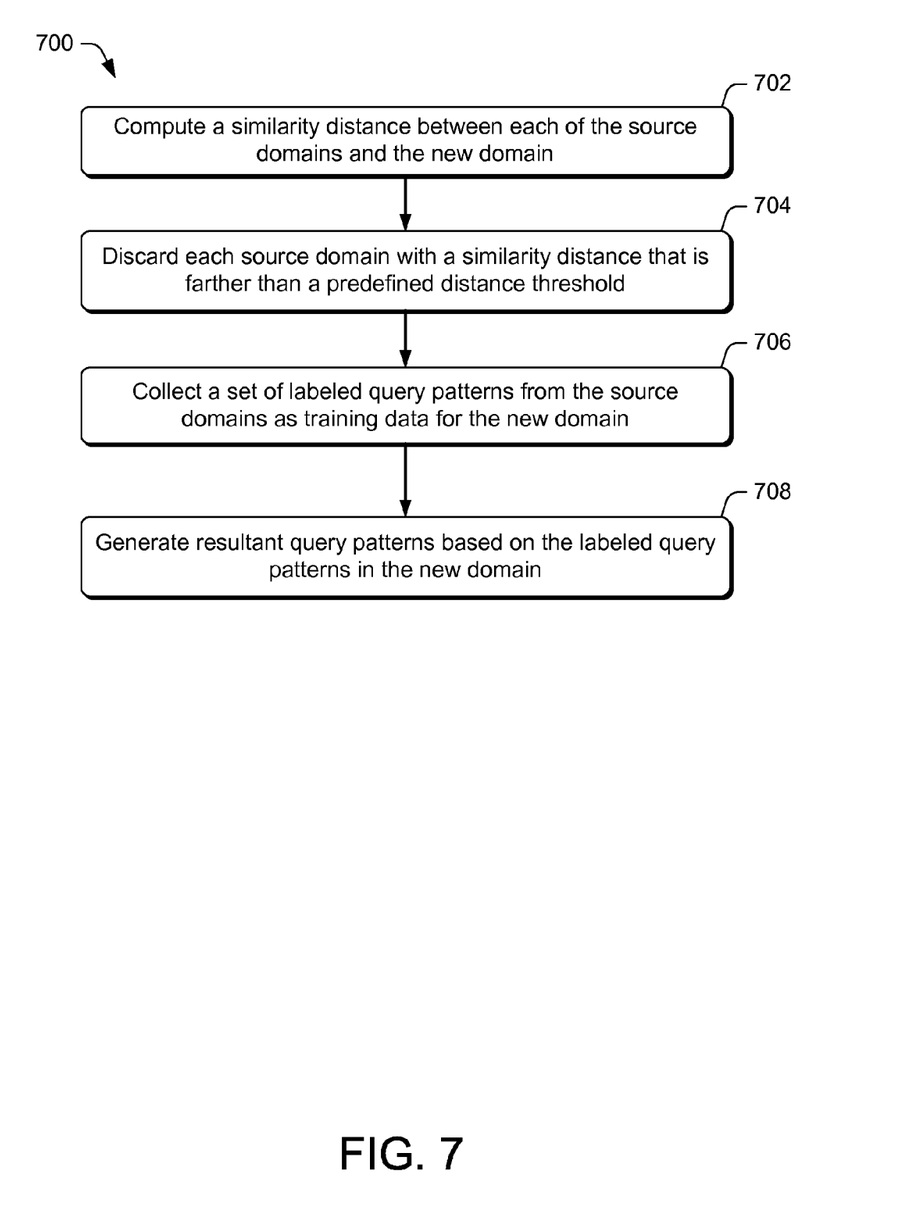
FIG. 7 is a flow diagram that illustrates an example process for transferring classification knowledge from multiple source domains to a new query task domain.

FIG. 7 is a flow diagram that illustrates an example process 700 for transferring classification knowledge from multiple source domains to a new domain. The example process 700 may further illustrate block 406 of the example process 400.

At block 702, the knowledge transfer component 244 of the learning transfer module 214 may compute a similarity between each of the source domains 102 and the new domain 106. In various embodiments, the similarity between any two domains may be calculated as a corresponding distance between the domains, in which the distance between the two domains increases when the similarity decreases.

At block 704, the knowledge transfer component 244 may discard each source domain with a distance that is farther than a predefined distance threshold, so that the remaining source domains 102 may be used as seed domains.

At block 706, the knowledge transfer component 244 may select the classification knowledge 104 simultaneously from multiple source domains 102 and transfer the knowledge to the new domain 106 by minimizing the objective function expressed in equation (7). Accordingly, only query patterns that are associated with high task probabilities in one of the source domains 102 and the new domain 106 may ultimately end up as classification knowledge 104 in the new domain 106. Each of the transferred query pattern may also include an associated task classification and an associated task probability, which may be encapsulated as a <pattern, task, probability> data set.

At block 708, the expansion component 246 may further supplement the query patterns that are transferred to the new domain 106 with additional query patterns. The supplementation may be implemented via the use of a Random Walk model algorithm on a click graph. The supplementation may create resultant query patterns 254 for the new domain 106. Each of the additional query pattern that is generated may also include an associated task classification and an associated task probability, which may be encapsulated as a <pattern, task, probability> data set.

The techniques described herein for the transfer of learning from one or more source domains to a new domain may significantly reduce the time cost and human effort consumed during the generation of the new domain for query classification. Thus, the techniques offer a highly efficient way to quickly scale up the number of domains and corresponding domain-specific query classifiers for a search engine. As a result, user satisfaction with the perceived accuracy and usefulness of search query results generated by such a search engine may be increased.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

The invention claimed is:

1. A computer-readable storage medium storing computer-executable instructions that, when executed, cause one or more processors to perform acts comprising:
    preparing a new domain to receive classification knowledge from one or more source domains by populating the new domain with preliminary query patterns extracted from a search engine log;
    preparing the classification knowledge in at least one source domain for transfer to the new domain; and
    transferring the classification knowledge from one or more source domains to the new domain, the transferring comprising:
        computing similarity distances between a plurality of source domains and the new domain;
        discarding at least one of the plurality of source domains with a similarity distance that is greater than a predefined distance threshold to generate the one or more source domains;
        selecting one or more query patterns of the one or more source domains for the new domain based at least on consistency between the one or more query patterns and the preliminary query patterns; and
        transferring the one or more query patterns that are selected to the new domain.

2. The computer-readable storage medium of claim 1, further comprising instructions that, when executed, cause the one or more processors to perform acts comprising:
    selecting features for classifier training from the classification knowledge transferred to the new domain; and
    constructing a classifier based on the features selected for classifier training.

3. The computer-readable storage medium of claim 2, further comprising instructions that, when executed, cause the one or more processors to perform an act of classifying a search query into the new domain using the classifier.

4. The computer-readable storage medium of claim 1, wherein the preparing the classification knowledge in each of the one or more source domains include:
    extracting seed query patterns for a particular source domain from the search engine log;
    labeling each of the seed query patterns with an associated task classification and an associated task probability that represent a probability that a corresponding seed query pattern belongs to the associated task classification; and
    generating additional query patterns for the particular source domain based at least on the seed query patterns to form an expanded set of query patterns, each of the additional query patterns having a corresponding task classification and a corresponding task probability.

5. The computer-readable storage medium of claim 4, wherein the preparing the classification knowledge in each of the one or more source domains includes refining the expanded set of query patterns by discarding at least one query pattern of the expanded set of query patterns based on a manually inputted discard command.

6. The computer-readable storage medium of claim 4, wherein the selecting includes minimizing at least one objective function to select query patterns from the expanded set of query patterns of a source domain for the new domain based at least on consistency between the query patterns selected and the preliminary query patterns.

7. The computer-readable storage medium of claim 1, further comprising discarding at least one query pattern with a task probability that is below a probability threshold.

8. The computer-readable storage medium of claim 6, further comprising generating additional query patterns for the new domain based at least on the selected query patterns to form an enlarged set of query patterns.

9. The computer-readable storage medium of claim 8, further comprising refining the enlarged set of query patterns by discarding at least one query pattern of the enlarged set of query patterns with a task probability that is below a probability threshold.

10. The computer-readable storage medium of claim 1, wherein a query pattern that is selected includes an associated task classification and an associated task probability that represent a probability that a corresponding selected query pattern belongs to the associated task classification.

11. The computer-readable storage medium of claim 1, wherein the transferring further includes:
generating additional query patterns for the new domain based at least on the one or more query patterns that are selected to form an enlarged set of query patterns, each of the additional query patterns having a corresponding task classification and a corresponding task probability; and
refining the enlarged set of query patterns by discarding at least one query pattern of the enlarged set of query patterns with a task probability that is below a probability threshold.

12. A computer implemented method, comprising:
computing similarity distances between a plurality of source domains and a new domain;
discarding at least one of the plurality of source domains with a similarity distance that is greater than a predefined distance threshold to generate a remaining source domain;
extracting seed query patterns for the remaining source domain from a search engine log;
labeling each of one or more seed query patterns with an associated task classification and an associated task probability that represent a probability that a corresponding seed query pattern belongs to the associated task classification; and
generating additional query patterns for the remaining source domain based at least on the seed query patterns to form an expanded set of query patterns, each of the additional query patterns having a corresponding task classification and a corresponding task probability; and
transferring one or more resultant query patterns from the expanded set of query patterns to a new domain, the transferring comprising:
selecting one or more resultant query patterns of the remaining source domain for the new domain based at least on consistency between the one or more resultant query patterns and the seed query patterns; and
transferring the one or more resultant query patterns that are selected to the new domain.

13. The computer implemented method of claim 12, further comprising refining the expanded set of query patterns by discarding at least one query pattern of the expanded set of query patterns with a task probability that is below a probability threshold.

14. The computer implemented method of claim 12, further comprising preparing the new domain to receive a plurality of query patterns from the expanded set of query patterns from the remaining source domain by populating the new domain with seed query patterns extracted from the a search engine log.

15. The computer implemented method of claim 14, wherein the selecting includes minimizing an objective function to select the one or more resultant query patterns from the expanded set of query patterns for the new domain based at least on consistency between the one or more resultant query patterns and the seed query patterns.

16. The computer implemented method of claim 15, further comprising:
generating additional query patterns for the new domain based at least on the plurality of query patterns using a Random Walk model algorithm to form an enlarged set of query patterns; and
refining the enlarged set of query patterns by discarding at least one query pattern of the enlarged set of query patterns with a task probability that is below a probability threshold.

17. The computer implemented method of claim 16, further comprising:
selecting features for classifier training from the enlarged set of query patterns; and
constructing a classifier based on the features selected for classifier training.

18. A system, comprising:
one or more processors; and
a memory that includes a plurality of computer-executable components that are executed by the one or more processors, the plurality of computer-executable components comprising:
a domain preparation module that prepares a new domain to receive refined query patterns associated with one or more source domains by populating the new domain with preliminary query patterns extracted from a search engine log;
a source domain module that produces the refined query patterns associated with the one or more source domains for transfer to the new domain; and
a learning transfer module that transfers one or more of the refined query patterns from the one or more source domains to the new domain by computing similarity distances between a plurality of source domains and the new domain, discarding at least one of the plurality of source domains with a similarity distance that is greater than a predefined distance threshold to provide the one or more source domains, selecting one or more refined query patterns of the one or more source domains for the new domain based at least on consistency between the one or more refined query patterns and the preliminary query patterns, and transferring the one or more refined query patterns that are selected to the new domain.

19. The system of claim 18, wherein the source domain module produces the refined query patterns at least by:
extracting seed query patterns for a particular source domain from the search engine log;
labeling each of the seed query patterns with an associated task classification and an associated task probability that indicates a probability that a corresponding seed query pattern belongs to the associated task classification; and
generating additional query patterns for the particular source domain based at least on the seed query patterns to form the refined query patterns, each of the additional query patterns having a corresponding task classification.

20. The system of claim 18, wherein the learning transfer module minimizes at least one objective function to select the one or more refined query patterns of a particular source domain for the new domain based at least on consistency between the one or more refined query patterns and the preliminary query patterns, and wherein each of the one or more refined query patterns include an associated task classification and an associated task probability that represent a probability that a corresponding refined query pattern belongs to the associated task classification.

* * * * *